US012712983B2

(12) United States Patent
Lindmark

(10) Patent No.: US 12,712,983 B2
(45) Date of Patent: Aug. 18, 2026

(54) GENERATING PARTICIPANT-SPECIFIC INFORMATION IN A VIRTUAL MEETING

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 18/642,428

(22) Filed: Apr. 22, 2024

(65) Prior Publication Data

US 2025/0330555 A1 Oct. 23, 2025

(51) Int. Cl.
*H04N 7/15* (2006.01)
*G06Q 10/109* (2023.01)

(52) U.S. Cl.
CPC ............ *H04N 7/15* (2013.01); *G06Q 10/109* (2013.01)

(58) Field of Classification Search
CPC ...... G06F 3/0482; G06F 16/739; G06F 21/31; G06F 21/602; G06Q 10/10; G06Q 10/109; G06Q 10/107; G06V 10/25; G06V 40/172; G06V 40/174; G09B 5/06; G10L 15/26; H04L 9/3247; H04L 12/1818; H04L 12/1822; H04L 65/1093; H04L 65/403; H04L 67/535; H04L 12/1831; H04L 65/1016; H04L 67/1396; H04M 3/567; H04M 3/568; H04N 7/147; H04N 7/15; H04N 7/155; H04N 1/00209; H04N 5/2628; H04N 5/265; H04N 19/88; G01L 17/005; G06N 5/04
See application file for complete search history.

(56) References Cited

U.S. PATENT DOCUMENTS

| | | | | |
|---|---|---|---|---|
| 7,884,845 | B2 * | 2/2011 | Fuse | G09B 5/06 348/14.1 |
| 8,914,734 | B2 * | 12/2014 | Narayanaswamy | H04N 7/15 715/753 |
| 11,641,404 | B1 * | 5/2023 | Szczepański | H04L 67/535 709/204 |
| 11,736,492 | B2 * | 8/2023 | Lyons | H04L 9/3247 348/14.08 |
| 2005/0206720 | A1 * | 9/2005 | Cheatle | H04N 5/265 348/E7.079 |
| 2009/0210491 | A1 * | 8/2009 | Thakkar | H04L 12/1822 709/204 |
| 2014/0267560 | A1 * | 9/2014 | Bright-Thomas | H04N 19/88 348/14.08 |

(Continued)

*Primary Examiner* — Gerald Gauthier
(74) *Attorney, Agent, or Firm* — Lowenstein Sandler LLP

(57) ABSTRACT

A method includes providing, for display on a first client device of a first participant of a plurality of participants of a virtual meeting, a user interface (UI) during the virtual meeting. The UI includes multiple regions each presenting a visual item corresponding to a video stream generated by a client device of a respective participant of the virtual meeting. The method includes detecting engagement of the first participant with a first visual item corresponding to a video stream generated by a second client device of a second participant of the virtual meeting. The method further includes generating one or more information items associated with the second participant. The method further includes causing the one or more information items to be presented within the UI on the first client device of the first participant during the virtual meeting.

20 Claims, 7 Drawing Sheets

(56) References Cited

U.S. PATENT DOCUMENTS

| | | | | |
|---|---|---|---|---|
| 2014/0320591 | A1* | 10/2014 | Baron, Jr. | H04L 12/1818 348/14.08 |
| 2015/0002611 | A1* | 1/2015 | Thapliyal | H04M 3/567 704/270.1 |
| 2015/0149929 | A1* | 5/2015 | Shepherd | H04L 12/1822 715/753 |
| 2015/0288924 | A1* | 10/2015 | Liu | G06V 40/174 348/14.08 |
| 2015/0304607 | A1* | 10/2015 | Bader-Natal | H04L 12/1822 348/14.08 |
| 2018/0101760 | A1* | 4/2018 | Nelson | G06N 5/04 |
| 2018/0101823 | A1* | 4/2018 | Nelson | H04N 7/155 |
| 2018/0278605 | A1* | 9/2018 | Fitterer | H04L 12/1822 |
| 2019/0341050 | A1* | 11/2019 | Diamant | G06V 40/172 |
| 2019/0361884 | A1* | 11/2019 | Wulf | G06Q 10/107 |
| 2019/0379839 | A1* | 12/2019 | Hellerud | G01L 17/005 |
| 2020/0059561 | A1* | 2/2020 | Murali | H04M 3/568 |
| 2020/0210136 | A1* | 7/2020 | Kubo | H04N 7/155 |
| 2020/0295959 | A1* | 9/2020 | Fukasawa | H04L 12/1818 |
| 2020/0344278 | A1* | 10/2020 | Mackell | H04N 7/147 |
| 2020/0372140 | A1* | 11/2020 | Jaber | G06F 21/31 |
| 2021/0294484 | A1* | 9/2021 | Mano | G10L 15/26 |
| 2021/0399912 | A1* | 12/2021 | Stewart | G06Q 10/10 |
| 2022/0286313 | A1* | 9/2022 | Nouri | H04L 65/403 |
| 2022/0303314 | A1* | 9/2022 | Wu | H04L 65/1016 |
| 2022/0321614 | A1* | 10/2022 | Opoku-Agyemang | H04L 65/1093 |
| 2023/0006851 | A1* | 1/2023 | Chou | G06F 16/739 |
| 2023/0007060 | A1* | 1/2023 | Matsuura | H04N 1/00209 |
| 2023/0069324 | A1* | 3/2023 | Ifrach | H04N 5/2628 |
| 2023/0231973 | A1* | 7/2023 | Ifrach | H04L 65/403 348/14.08 |
| 2023/0239432 | A1* | 7/2023 | Deng | H04N 7/15 348/14.08 |
| 2024/0022618 | A1* | 1/2024 | Gambhir | H04L 12/1822 |
| 2024/0036710 | A1* | 2/2024 | Szczepanski | G06F 3/0482 |
| 2024/0220638 | A1* | 7/2024 | Li | H04L 12/1818 |
| 2024/0430117 | A1* | 12/2024 | Rivera-Rodriguez | G06V 10/25 |
| 2025/0330555 | A1* | 10/2025 | Lindmark | G06Q 10/109 |

* cited by examiner

GENERATING PARTICIPANT-SPECIFIC INFORMATION IN A VIRTUAL MEETING

TECHNICAL FIELD

Aspects and implementations of the present disclosure relate to virtual meetings and more specifically to generating participant-specific information in a virtual meeting.

BACKGROUND

Virtual meetings can take place between multiple participants via a virtual meeting platform. A virtual meeting platform can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface that includes multiple regions to present the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method including providing, for display on a first client device of a first participant of multiple participants of a virtual meeting, a user interface (UI) during the virtual meeting at a first point in time. The UI includes multiple regions each presenting a visual item corresponding to a video stream generated by a client device of a respective participant of the virtual meeting. The method includes detecting, via the UI during the virtual meeting at a second point in time, engagement of the first participant with a first visual item corresponding to a video stream generated by a second client device of a second participant of the virtual meeting. The method includes generating one or more information items associated with the second participant for the first participant. The one or more information items associated with the second participant being absent from the UI at the first point in time and the second point in time. The method includes causing the one or more information items associated with the second participant to be presented within the UI on the first client device of the first participant during the virtual meeting at a third point in time.

In an aspect, to generate one or more information items associated with the second participant for the first participant, the method includes automatically generating a prompt using information associated with the virtual meeting, providing the prompt and context associated with the engagement of the first participant with the first visual item corresponding to the video stream generated by the second client device as input to a generative Artificial Intelligence (AI) model, obtaining one or more outputs from the generative AI model, and generating the one or more information items using the one or more outputs. In an aspect, the one or more information items include a meeting history obtained from a calendar application. In an aspect, the one or more information items include data associated with the first participant obtained from a contacts application. In an aspect, causing the one or more information items associated with the second participant to be presented within the UI on the first client device of the first participant during the virtual meeting at the third point in time includes causing a region of the UI corresponding to the first visual item to be updated to display the one or more information item. The method may also include responsive to receiving input from the first participant via the first client device indicative of a request to update the one or more information items, updating the one or more information items according to the received input. In an aspect automatically generating the prompt using information associated with the virtual meeting includes generating the prompt using at least one of a title of the virtual meeting, shared meeting notes associated with the virtual meeting, a name of the first participant, or an email address of the first participant. The context includes at least one of documents, meeting notes, emails, meeting summarizations, or web browser history associated with the first participant.

Another aspect of the disclosure provides a system that includes a memory device. The system also includes a processing device coupled to the memory device. The processing device to perform operations. The operations include providing, for display on a first client device of a first participant of multiple participants of a virtual meeting, a UI during the virtual meeting at a first point in time. The UI includes a multiple regions each presenting a visual item corresponding to a video stream generated by a client device of a respective participant of the virtual meeting. The method includes detecting, via the UI during the virtual meeting at a second point in time, engagement of the first participant with a first visual item corresponding to a video stream generated by a second client device of a second participant of the virtual meeting. The method includes generating, using a generative AI model, one or more information items associated with the second participant for the first participant. The one or more information items associated with the second participant being absent from the UI at the first point in time and the second point in time. The method includes causing the one or more information items associated with the second participant to be presented within the UI on the first client device of the first participant during the virtual meeting at a third point in time.

Another aspect of the disclosure provides a non-transitory computer-readable storage medium including instructions that, when executed by a processing device, cause the processing device to perform operations. The operations include providing, for display on a first client device of a first participant of multiple participants of a virtual meeting, a UI during the virtual meeting at a first point in time. The UI includes a multiple regions each presenting a visual item corresponding to a video stream generated by a client device of a respective participant of the virtual meeting. The method includes detecting, via the UI during the virtual meeting at a second point in time, engagement of the first participant with a first visual item corresponding to a video stream generated by a second client device of a second participant of the virtual meeting. The method includes generating, using a generative AI model, one or more information items associated with the second participant for the first participant. The one or more information items associated with the second participant being absent from the UI at the first point in time and the second point in time. The method includes causing the one or more information items associated with the second participant to be presented within the UI on the first client device of the first participant during the virtual meeting at a third point in time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
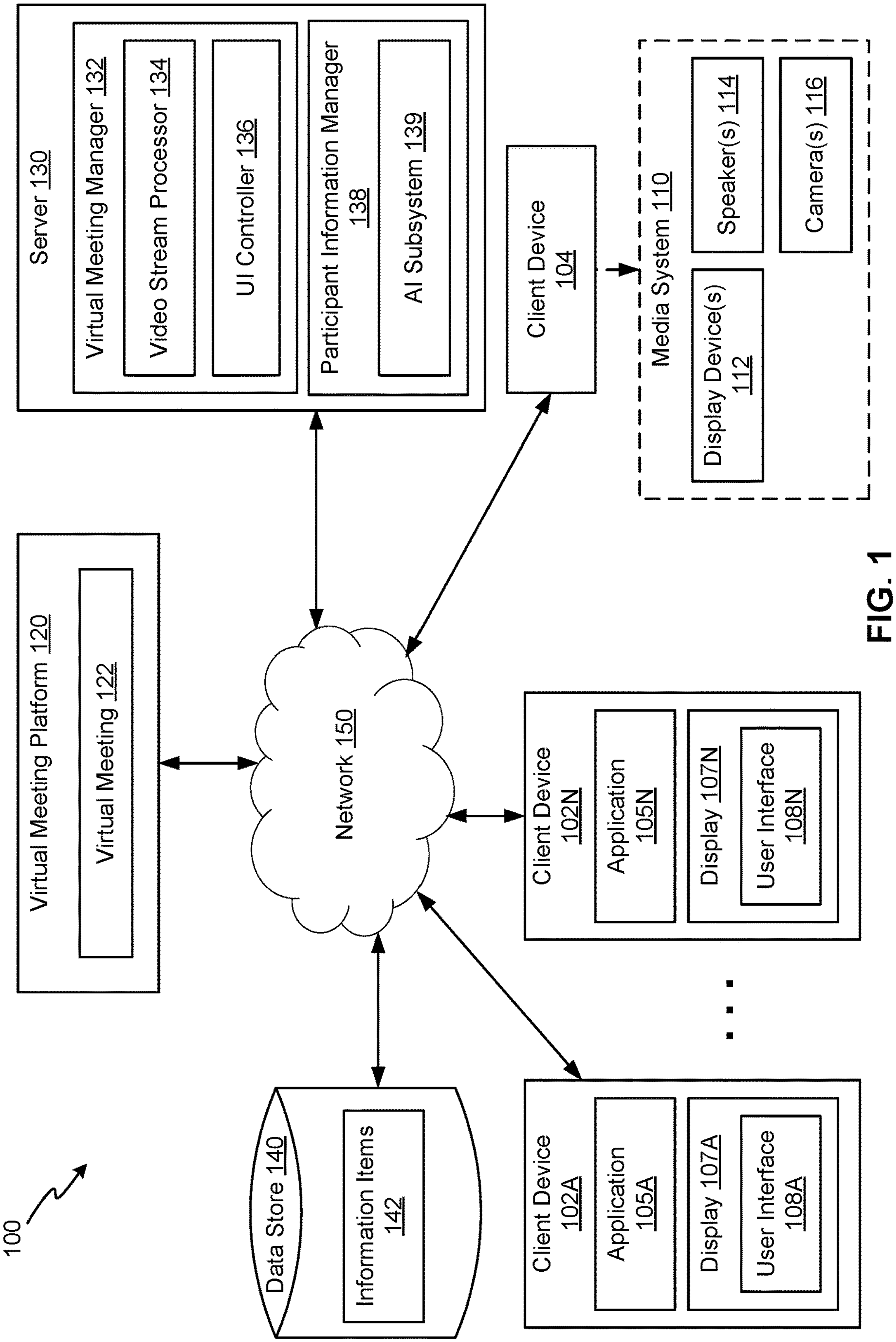
FIG. 1 illustrates an example system architecture, in accordance with at least one embodiment of the present disclosure.

Aspects of the present disclosure relate to generating participant-specific information in a virtual meeting. A platform can enable users to connect with other users through a video or audio-based virtual meeting (e.g., a conference call, a video conference, etc.). The platform can provide tools that allow client devices associated with users (referred to herein as participants) to share audio data and/or video data with client devices associated with other participants (e.g., over a network). The number of participants in a virtual meeting can be large (e.g., 100 participants or more) as participants may attend the meeting without physically traveling to the meeting. As a result, participants may struggle to identify and track information about other participants that may be useful to optimize the quality of meetings, develop relationships, discuss solutions, track preference, adapt to personal styles, and the like.

Some platforms (or client devices connected to platforms) can have various applications that allow users to create and share electronic documents for note keeping within a virtual meeting across several virtual meetings. For example, conventional implementations of a virtual meeting platform may provide a dedicated region within a virtual meeting User Interface (UI) in which participants can input meeting notes in real time. In some instances, multiple participants may contribute to meeting notes simultaneously for real-time collaboration. However, conventional implementations of note-taking applications fail to provide a suitable medium for recording participant-specific information. For example, notes may contain personal information (e.g., phone numbers, email addresses, likes, dislikes) not intended to be shared. Thus, a shared meeting notes document for a virtual meeting may not be an appropriate medium to store information or opinions that are not intended to be shared.

In some instances, conventional implementations of a virtual meeting platform may provide a medium (e.g., a dedicated area of a UI, dedicated panel, etc.) for a user to privately record meeting notes that are not shared among other participants of the virtual meeting. However, such conventional implementations are an ineffectual medium for tracking participant-specific information. Meeting notes may include excessive detail (e.g., agenda items, discussion summaries, action items, decisions made, follow-up tasks, etc.) such that participant-specific details may be obscured and difficult to find. For example, upon seeing a participant join a virtual meeting, a user may search present or previous meeting notes to determine information about the participant. Users may find it tedious to sift through long paragraphs of irrelevant content in their meeting notes to find a specific piece of information about a particular participant.

Additionally, the user may be distracted by their searching through meeting notes and therefore may not be fully engaged in the meeting discussion. As a result, discussion topics may be covered again (sometimes multiple times) during the meeting, which can increase the overall duration of the virtual meeting. Computing resources (e.g., processing cycles, memory space, etc.) are consumed by the platform and/or client devices connected to the platform to facilitate the increased duration of the virtual meeting. Such resources are unavailable to other processes (e.g., of the platform, of the client devices, etc.), which can increase an overall latency and decrease an overall efficiency of the system.

A further obstacle for current implementations of meeting notes in a virtual meeting includes how a user inputs/engages with meeting notes. In many instances, taking meeting notes may involve a user working in different contexts and different UIs. For example, a user may load a note-taking application separate from the virtual meeting platform to record notes about a specific participant of the meeting, thereby breaking the continuity of the meeting for the user as the user may be unable to interact with the virtual meeting while taking notes in a UI separate from the virtual meeting. As a result, discussion topics may be covered again during the meeting, increasing the duration of the meeting, which can cause a large amount of computing resources to be unavailable to other processes, as described above. The above-described challenges and obstacles associated with conventional note-taking applications can render such a note-taking application ineffective within the context of a virtual meeting, and often overlooked as a resource for recording participant-specific information within a virtual meeting.

Implementations of the present disclosure address the above and other deficiencies by providing systems and methods that automatically generate and display participant-specific information to a requesting participant in a virtual meeting. A participant (also referred to as "requesting participant" herein) of a virtual meeting can be presented with a virtual meeting UI displaying visual items corresponding to video streams of the other participants of the virtual meeting. The requesting participant may engage with an affordance (e.g., a button, a designated region, etc.) associated with a visual item of another participant of the virtual meeting. In response to the engagement, the participant can be presented, within the UI, information associated with the other participant of the virtual meeting. For example, the virtual meeting UI may provide a visual effect such that the visual item corresponding to the video stream of the other participant appears to visually flip around to show another side of the visual item containing information about the other participant.

In implementations, the above functionalities can be supported using an AI model (e.g., a generative AI model) that is trained to generate participant-specific information pertaining to a participant of a virtual meeting. The information (also referred to as "information items" herein) can include an AI-generated summary about the participant including, but not limited to, the role of the participant within an organization, preferences associated with the participant, previous interactions with the participant, and the like. Information items, as used herein, can refer to a piece of data, information, or content and can include textual data, images, video, audio files, datasets, and the like. The information can be displayed to the requesting participant. In some embodiments, the requesting participant can manually update the information by interacting with the visual item (e.g., via an input device) to add textual notes during the virtual meeting without leaving the virtual meeting context. In some embodiments, the manually added textual notes can be stored such that they may persist across future virtual meetings.

Information associated with the virtual meeting can be used to prompt the AI model, which can be trained to generate information about a given participant of the virtual meeting. For example, the prompt may include information specific to the virtual meeting (e.g., the meeting title, shared meeting notes, etc.) and information specific to the participant (e.g., the name of the participant, the email address of the participant, etc.). In some embodiments, the AI model can be trained on a large corpus of data to learn patterns and generate participant-specific summarizations using an information base (also referred to as "information context" herein) including available information such as previous interactions between the participants, documents, meeting notes, emails, web browser history, or any information available to the requesting participant. In additional or alternative embodiments, the AI model may be fine-tuned to function within a specific organization and/or within a specific type of virtual meeting.

Aspects of the present disclosure provide technical advantages over previous solutions. Aspects of the present disclosure can provide a way for a virtual meeting to generate participant specific-information for use during a virtual meeting. Aspects of the present disclosure provide access to one or more AI-generated summaries of information specific to participants of the virtual meeting, which increases the efficiency of the virtual meeting. Aspects of the present disclosure can provide an AI model that automatically generates participant-specific information and functionality to quickly access/update such information, allowing participants of the virtual meeting to more fully participate in the meeting. As such, participants can be fully engaged in the virtual meeting discussion without distractions caused by taking notes in a separate application or searching for participant-specific information, which can reduce the overall duration of the virtual meeting. As the duration of the virtual meeting is reduced, the amount of computing resources consumed by the platform and/or the client devices connected to the platform is also reduced. Such resources are therefore available to other processes (e.g., at the platform and/or the client devices), which can decrease an overall latency and increase an overall efficiency of the system.

Additionally, aspects and implementations of the present disclosure improve access to participant-specific information by providing a tool for automatically generating participant-specific information and displaying such information at a convenient location within a virtual meeting UI. Such improved access to participant-specific information, for example, can enable participants to respond quicker to virtual meeting interactions and adapt their responses to be more agreeable to other participants. In another example, participants using the tool can appear more interested in other participants by referencing personal details or referring to past events using the generated information. With such improved access to information, participants using the tool can avoid sensitive topics that previously led to controversies or sidetracked conversations. Additionally, participants can use the tool to build argumentation on known facts and agreements from past meetings that can be included within the automatically generated information.

FIG. 1 illustrates an example system architecture 100, in accordance with implementations of the present disclosure. The system architecture 100 includes one or more client devices 102A-N or 104, a virtual meeting platform 120, a server 130, and a data store 140, each connected to a network 150.

In some implementations, the virtual meeting platform 120 enables users of one or more of the client devices 102A-N, 104 to connect with each other in a virtual meeting (e.g., a virtual meeting 122). A virtual meeting 122 refers to a real-time communication session such as a video-based call or video chat, in which participants can connect with multiple additional participants in real-time and be provided with audio and video capabilities. A virtual meeting 122 can include an audio-based call or chat, in which participants connect with multiple additional participants in real-time and are provided with audio capabilities. Real-time communication refers to the ability for users to communicate (e.g., exchange information) instantly without transmission delays and/or with negligible (e.g., milliseconds or microseconds) latency. The virtual meeting platform 120 can allow a user of the virtual meeting platform 120 to join and participate in a virtual meeting 122 with other users of the virtual meeting platform 120 (such users sometimes being referred to, herein, as "virtual meeting participants" or, simply, "participants"). Implementations of the present disclosure can be implemented with any number of participants connecting via the virtual meeting 122 (e.g., up to one hundred or more).

In implementations of the disclosure, a "user" or "participant" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the virtual meeting platform 120 or the virtual meeting manager 132 collects user information (e.g., information about a user's social network, social actions or activities, profession, a user's preferences, or a user's current location), or to control whether or how to receive content from the virtual meeting platform 120 or the virtual meeting manager 132 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the virtual meeting platform 120 or the virtual meeting manager 132.

In some implementations, the server 130 includes a virtual meeting manager 132. The virtual meeting manager 132, in one or more implementations, is configured to manage a virtual meeting 122 between multiple users of the virtual meeting platform 120. The virtual meeting manager 132 can provide the UI 108A-N to each client device 102A-N, 104 to enable users to watch and listen to each other during a virtual meeting 122. The virtual meeting manager 132 can also collect and provide data associated with the virtual meeting 122 to each participant of the virtual meeting 122. In some implementations, the virtual meeting manager 132 provides the UIs 108A-N for presentation by client applications 105A-N. For example, the respective UIs 108A-N can be displayed on the display devices 107A-107N by the client applications 105A-N executing on the operating systems of the client devices 102A-N, 104. In some implementations, the virtual meeting manager 132 determines visual items for presentation in the UIs 108A-N during a virtual meeting 122. A visual item can refer to a UI element that occupies a particular region in the UI 108A-N and is dedicated to presenting a video stream from a respective client device 102A-N, 104. Such a video stream can depict, for example, a user of the respective client device 102A-N, 104 while the user is participating in the virtual meeting 122 (e.g., speaking, presenting, listening to other participants, watching other participants, etc., at particular moments during the virtual meeting 122), a physical conference or meeting room (e.g., with one or more participants present), a document or media content (e.g., video content, one or more images, etc.) being presented during the virtual meeting 122, etc.

In some implementations, the virtual meeting manager 132 includes a video stream processor 134 and a UI controller 136. Each of the video stream processor 134 or the UI controller 136 may include a software application (or a subset thereof) that performs certain virtual meeting functionality for the virtual meeting manager 132. The video stream processor 134 can be configured to receive video streams from one or more of the client devices 102A-N, 104. The video stream processor 134 can be configured to determine visual items for presentation in the UI of such client devices 102A-N, 104 (e.g., the UIs 108-108N, discussed below) during the virtual meeting 122. Each visual item can correspond to a video stream from a client device 102A-N, 104 (e.g., the video stream pertaining to one or more participants of the virtual meeting 122). In some implementations, the virtual meeting 122 further includes, for each participant of the one or more participants, first audio data associated with an audio stream produced by a client device 102A-N, 104 of a respective participant. The video stream processor 134 can receive audio streams associated with the video streams from the client devices (e.g., from an audiovisual component of the client devices 102A-N, 104). Once the video stream processor 134 has determined visual items for presentation in the UI, the video stream processor 134 can notify the UI controller 136 of the determined visual items. The visual items for presentation can be determined based on current speaker, current presenter, order of the participants joining the virtual meeting 122, list of participants (e.g., alphabetical), etc.

In some implementations, the UI controller 136 provides the UI for the virtual meeting 122. The UI can include multiple regions. Each region can display a video stream pertaining to one or more participants of the virtual meeting 122. The UI controller 136 can control which video stream is to be displayed by providing a command to one or more client devices 102A-N, 104 that indicates which video stream is to be displayed in which region of the UI (along with the received video and audio streams being provided to the client devices 102A-N, 104). For example, in response to being notified of the determined visual items for presentation in the UI 108A-N, the UI controller 136 can transmit a command causing each determined visual item to be displayed in a region of the UI and/or rearranged in the UI.

In one or more implementations, the virtual meeting manager 132 includes a Participant information manager 138. The Participant information manager 138 may include a software application that performs certain virtual meeting functionality for the virtual meeting manager 132. The Participant information manager 138 can be configured to present information associated with a participant of the virtual meeting 122, generate information associated with a participant of the virtual meeting 122, present one or more calendar events, present notes manually written by a user, as discussed herein. Information generated and/or presented by participant information manger 138 can generally be referred to as information items 142 herein. The Participant information manager 138 can include an AI subsystem 139. The AI subsystem 139 can include one or more AI models configured to generate participant-specific information during virtual meeting 122 and generate one or more summaries of a participant of a virtual meeting 122, as discussed herein. The Participant information manager 138 can use the AI subsystem 139 to assist the Participant information manager 138 in performing one or more operations. Functionality of the Participant information manager 138 is discussed further below in relation to FIG. 2B.

In some implementations, each of the virtual meeting platform 120 or the server 130 include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 122. The virtual meeting platform 120 can also include a website (e.g., one or more webpages) or application back-end software that can be used to enable a user to connect with other users by way of the virtual meeting 122.

In some implementations, the one or more client devices 102A-N each include one or more computing devices such as personal computers (PCs), laptops, mobile phones, smart phones, tablet computers, netbook computers, network-connected televisions, etc. The one or more client devices 102A-N can also be referred to as "user devices." Each client device 102A-N can include an audiovisual component that can generate audio and video data to be streamed to the virtual meeting manager 132. The audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-N. In some implementations, the audiovisual component includes an image capture device (e.g., a camera) to capture images and generate video data (e.g., a video stream) of the captured data of the captured images.

In some implementations, the system architecture 100 includes a client device 104. The client device 104 can differ from a client device of the one or more client devices 102A-N because the client device 104 may be associated with a physical conference or meeting room. Such client device 104 can include or be coupled to a media system 110 that can include one or more display devices 112, one or more speakers 114 and one or more cameras 116. The display device 112 can be, for example, a smart display or a non-smart display (e.g., a display that is not itself configured to connect to the network 150). Users that are physically present in the room can use the media system 110 rather than their own devices (e.g., one or more of the client devices 102A-N) to participate in the virtual meeting 122, which can include other remote users. For example, the users in the room that participate in the virtual meeting 122 can control the display device 112 to show a slide presentation or watch slide presentations of other participants. Sound and/or camera control can similarly be performed. Similar to the one or more client devices 102A-N, the client device 104 can generate audio and video data to be streamed to the virtual meeting manager 132 (e.g., using one or more microphones, speakers 114 and cameras 116).

As described previously, an audiovisual component of each client device 102A-N, 104 can capture images and generate video data (e.g., a video stream) of the captured data of the captured images. In some implementations, the client devices 102A-N, 104 transmit the generated video stream to the virtual meeting manager 132. The audiovisual component of each client device 102A-N, 104 can also capture an audio signal representing speech of a user and generate audio data (e.g., an audio file or audio stream) based on the captured audio signal. In some implementations, the client devices 102A-N, 104 transmit the generated audio data to the virtual meeting manager 132.

In some implementations, each client device 102A-N or 104 includes a respective client application 105A-N, which can be a mobile application, a desktop application, a web browser, etc. The client application 105A-N can present, on a display device 107A-N of a client device 102A-N or a UI (e.g., a UI of the UIs 108A-N), one or more features of the application 105A-N for users to access the virtual meeting platform 120. For example, a user of a first client device 102A can join and participate in the virtual meeting 122 via a UI 108A presented on the display device 107A by the application 105A. The user can present a document to participants of the virtual meeting 122 using the UI 108A. Each of the UIs 108A-N can include multiple regions to present visual items corresponding to video streams of the client devices 102A-N provided to the server 130 for the virtual meeting 122.

In one or more implementations, one or more components of the virtual meeting manager 132 are part of a client device 102A-N and/or client device 104. For example, the application 105A-N can include the Participant information manager 138, which can present data associated with an absent virtual meeting user, generate notes or summaries based on the virtual meeting 122, and perform other functionality. In some implementations, the application 105A of a first client device 102A sends the video stream produced by the client device 102A to the other client devices 102B-N, 104 and receives the video streams from the other client devices 102B-N, 104, and the applications 105A-105N can generate their respective virtual meeting UIs 108A-108N or can finalize their respective UIs 108A-N, which may have been partially generated by the UI controller 136.

In some implementations, the data store 140 is a persistent storage that is capable of storing data as well as data structures to tag, organize, and index the data. A data item can include audio data and/or video stream data, in accordance with implementations described herein. The data store 140 can be hosted by one or more storage devices, such as main memory, magnetic or optical storage-based disks, tapes, hard drives, flash memory, and so forth. In some implementations, the data store 140 is a network-attached file server, while in other implementations, the data store 140 is some other type of persistent storage such as an object-oriented database, a relational database, and so forth, that can be hosted by the virtual meeting platform 120 or one or more different machines (e.g., the server 130) coupled to the virtual meeting platform 120 using the network 150. In some implementations, the data store 140 stores portions of audio and video streams received from one or more client devices 102A-N, 104 for the virtual meeting platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-N, 104 and/or concurrently editable by the users. In some implementations, the data store stores information items 142. Information items 142 can include, but is not limited to, data generated by AI subsystem 139 about one or more participant of the virtual meeting (e.g., participant summaries), notes taken by a user during the virtual meeting 122, a transcript of the virtual meeting 122, or other data, as discussed herein.

In some implementations, the network 150 includes a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

It should be noted that in some implementations, the functions of the virtual meeting platform 120 or the server 130 are provided by a fewer number of machines. For example, in some implementations, the server 130 is integrated into a single machine, while in other implementations, the server 130 is integrated into multiple machines. In addition, in one or more implementations, the server 130 is integrated into the virtual meeting platform 120.

In general, one or more functions described in the several implementations as being performed by the virtual meeting platform 120 or server 130 can also be performed by the client devices 102A-N, 104 in other implementations, if appropriate. In addition, in some implementations, the functionality attributed to a particular component can be performed by different or multiple components operating together. The virtual meeting platform 120 or the server 130 can also be accessed as a service provided to other systems or devices through appropriate application programming interfaces, and thus is not limited to use in websites.

Although implementations of the disclosure are discussed in terms of the virtual meeting platform 120 and users of the virtual meeting platform 120 participating in a virtual meeting 122, implementations can also be generally applied to any type of telephone call, conference call, or other technological communications methods between users. Implementations of the disclosure are not limited to virtual meeting platforms that provide virtual meeting tools to users.

Figure 2A:
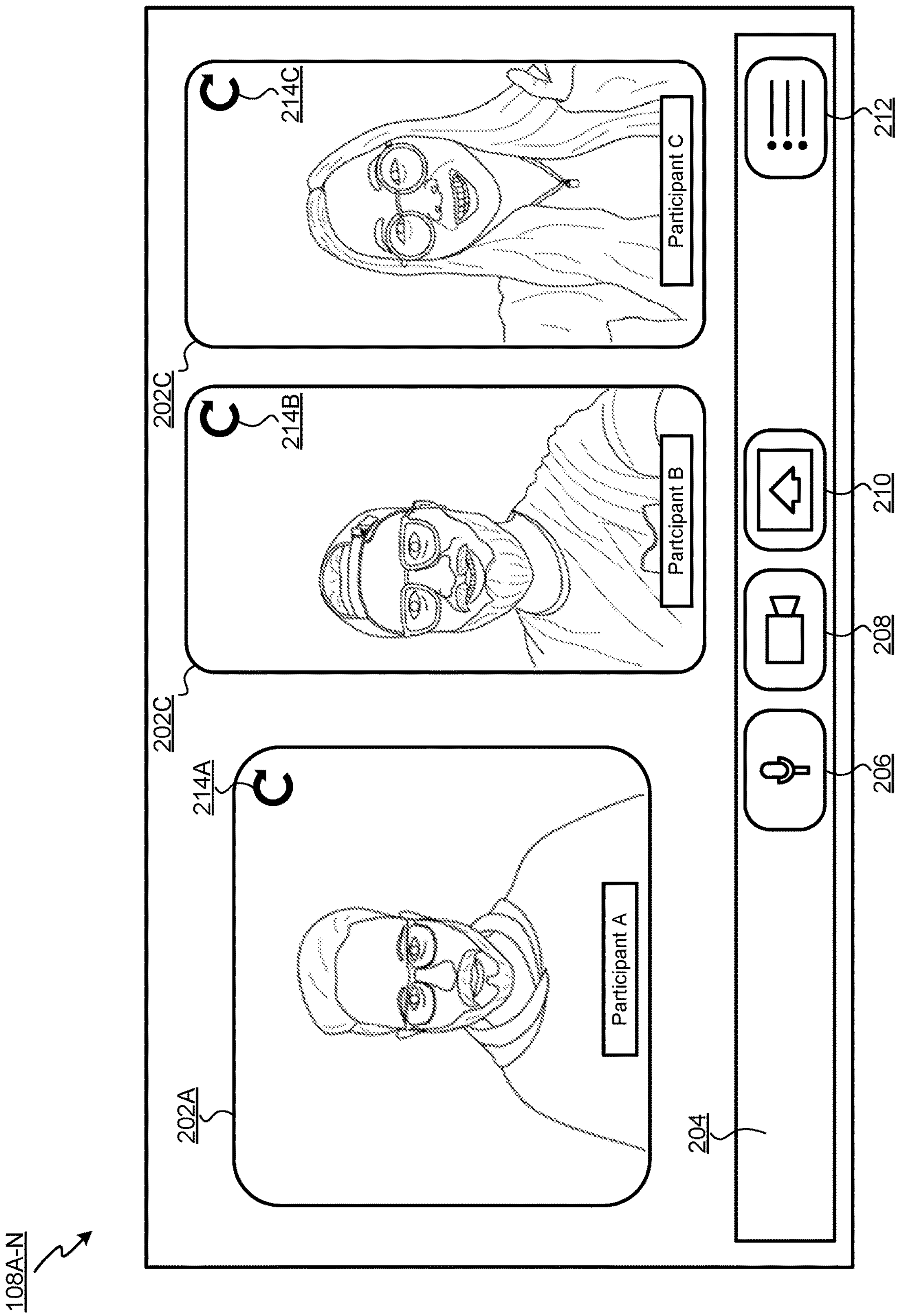
FIG. 2A illustrates an example user interface (UI) of a virtual meeting, in accordance with at least one embodiment of the present disclosure.

FIG. 2A illustrates an example user interface (UI) 108A-N for a virtual meeting 122, in accordance with some embodiments of the present disclosure. The UI 108A-N may be provided by one or more processing devices of a server, such as server 130 of FIG. 1, or client device 102A-N. In some embodiments, the UI 108A-N may be provided by a virtual meeting manager, such as virtual meeting manager 132 of FIG. 1, for presentation at a client device (e.g., client devices 102A-N of FIG. 1). In some implementations, the virtual meeting 122 between multiple participants may be managed by a virtual meeting platform, such as virtual meeting platform 120 of FIG. 1. As described with respect to FIG. 1, virtual meeting manager 132 can enable participants (e.g., participants A-C seen in FIG. 2A) to join and participate in the virtual meeting 122.

As illustrated in FIG. 2A, UI 108A-N can include one or more visual items. A visual item may refer to a UI element that occupies a particular region in the UI. In some instances, and by way of a non-limiting example, a visual item can be dedicated to presenting a video stream from a respective client device (e.g., a client device from client devices 102A-N in FIG. 1) to other client devices (e.g., a different client device from client devices 102A-N in FIG. 1). Such a video stream may depict, for example, a user of the respective client device while the user is participating in the virtual meeting 122 (e.g., speaking, presenting, listening to other participants, watching other participants, etc., at particular moments during the virtual meeting 122), a physical conference or meeting room (e.g., with one or more participants present), a document or media content (e.g., video content, one or more images, etc.) being presented during the virtual meeting 122, and the like.

In some embodiments, and dependent on the type and purpose of the virtual meeting, multiple visual items and respective regions in the UI 108A-N may be incorporated. As illustrated, UI 108A-N may include multiple regions 202A-C that can include different visual items of the virtual meeting 122, such as video streams provided by respective client devices 102A-N. For example, region 202A can include a visual item of a visual stream of Participant A provided by a client device 102A, and so forth. Although FIG. 2A depicts UI 108A-N as having three regions, one of ordinary skill in the art, having the benefit of this disclosure, will understand that more (or fewer) visual items and/or associated regions can be included in UI 200 for presentation to a user, as can be reasonable to be perceived and understood by the human eye.

In some embodiments, the virtual meeting UI 108A-N can include a toolbar 204 that includes one or more UI elements configured to perform virtual meeting operations. For example, as seen in FIG. 2A, the toolbar 204 includes an audio control button 206 used to mute and unmute a participant's audio stream, a camera control button 208 used to cease to display and display a participant's video stream, and a screen share button 210 used to share a participant's client device's 102A-N screen with other participants of the virtual meeting 122. In some implementations, the toolbar 204 can include one or more buttons that, responsive to a participant interacting with the buttons, cause the participant information manager 138 to use an AI model, such as AI model included in AI subsystem 139, to generate one or more information items about another participant of the virtual meeting. The UI 108A-N may display the one or more information items.

In some implementations, the UI 108A-N can also include an options region (not illustrated in FIG. 2A) for providing selectable options to adjust display settings (e.g., a size of each region 202A-C, a number of regions, a selection of a video stream, etc.), invite additional users to participate, etc. In some implementations, the UI 108A-N can include a UI element (e.g., an icon) (not illustrated in FIG. 2A) that corresponds to a self-view indicator, which may indicate to a participant if the participant's video stream is displayed in a region in the UI.

In some embodiments, the user can interact with the UI 108A-N to cause a modification of a size or a position of video streams displayed within the UI 108A-N. For example, the user can use an input device (e.g., a keyboard, a touch screen etc.) or a cursor device (e.g., a mouse) associated with the client device to cause a modification of the size or the position of the video streams displayed within the UI 108A-N. One of ordinary skill in the art, having the benefit of this disclosure, will be able to design and implement a variety of ways that a user can modify the UI 108A-N to their liking, while still achieving similar results as the UI 108A-N presented.

As illustrated, each region 202A-C can include a respective UI element 214A-C. In some embodiments, the user can engage with (e.g., via an input device such as a touch screen, a mouse, etc.) a UI element 214A-C to cause one or more information items associated with the corresponding participant to be displayed within the respective region 202A-C. For example, the user may engage with the UI element 214A to cause one or more information items associated with Participant A to be displayed within the region 202A. In some embodiments, the UI 108A-N can be programmed to create an animated effect to transition from displaying the visual item of the video stream of Participant A to displaying one or more information items associated with Participant A. For example, UI user interface 108A can be programmed to animate a "flip" effect to rotate the visual item to give the illusion to the user that visual item is flipping over. As the visual item flips, the content displayed within the region 202A can change from the visual item of Participant A's video stream to one or more information items associated with Participant A, as illustrated below with respect to FIG. 2B. In some embodiments, the user may engage with any location within the region 202A to cause one or more information items associated with Participant A to be displayed within the region 202A. In some embodiments, multiple regions 202A-C can simultaneous be "flipped" to display corresponding information items in response to a user interaction/engagement.

Figure 2B:
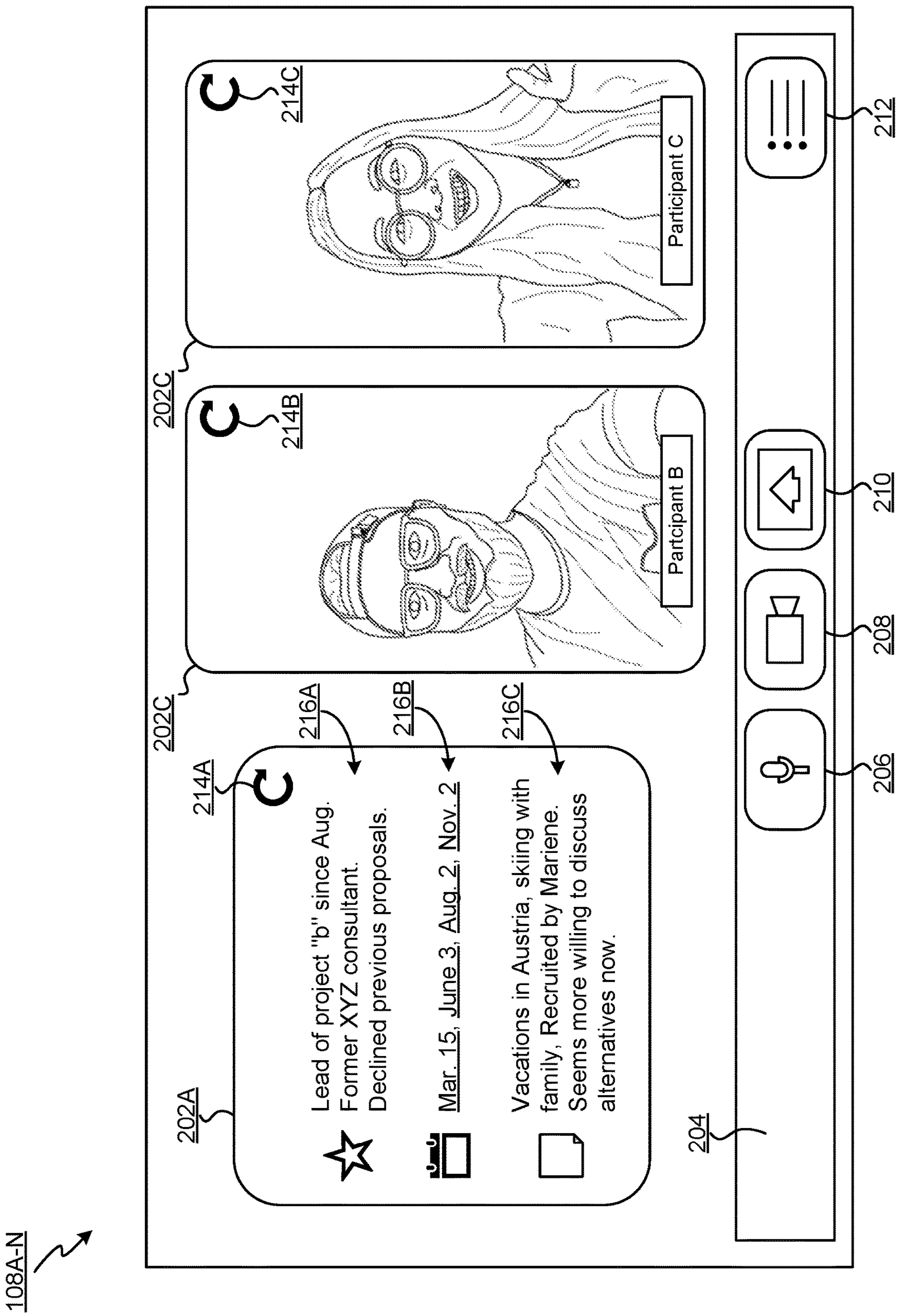
FIG. 2B illustrates an example user interface (UI) displaying one or more information items associated with a participant of a virtual meeting, in accordance with at least one embodiment of the present disclosure.

FIG. 2B illustrates an example UI 108A-N displaying one or more information items associated with a participant of a virtual meeting 122, in accordance with at least one embodiment of the present disclosure. The UI 108A-N may be provided by one or more processing devices of a server, such as server 130 of FIG. 1, or client device 102A-N. In some embodiments, the UI 108A-N may be provided by a virtual meeting manager, such as virtual meeting manager 132 of FIG. 1, for presentation at a client device (e.g., client devices 102A-N of FIG. 1).

As illustrated, responsive to a user interaction with UI element 214A, one or more information items may be provided by a virtual meeting manager, such as virtual meeting manager 132 of FIG. 1, for presentation within respective regions 216A-C of the UI 108A-N. The one or more information items can include automatically generated data/information associated with Participant A. In one or more implementations, virtual meeting manager 132 or some other component of server 130 can generate information items for display within region 216A.

In some embodiments, generating information items for display within region 216A includes using a generative AI model to generate the information item. The generative AI model can be part of AI subsystem 139 of the participant information manager 138. The generative AI model can include a Large Language Model (LLM) or another type of generative AI model as discussed below in relation to FIG. 3. Using the generative AI model to generate information about Participant A can include providing a generative AI prompt as input into the generative AI model. In some embodiments, a prompt subsystem can support the generative AI model and automatically generate the generative AI prompt. The generative AI prompt can be based, at least in part, on textual content associated with the virtual meeting 122 and/or Participant A. Such textual content can include a name title of the virtual meeting 122, shared meeting notes associated with the virtual meeting 122, a name of the first participant, an email address of the first participant, and the like. For example, the prompt subsystem can generate the following generative AI prompt: "Generate a brief summary about Participant A in the context of the present virtual meeting entitled "Project B Braining Storming Session."

In some embodiments, the prompt subsystem can be configured to perform automated identification of, and facilitate retrieval of, relevant and timely contextual information for efficient and accurate processing of prompts by the generative AI model. The prompt subsystem can identify and obtain contextual information from a variety of information sources including, but not limited to, documents, meeting notes, emails, meeting summarizations, or web browser history associated with the first participant. The prompt subsystem can generate the generative AI prompt based, at least in part, on the identified contextual information. For example, the prompt subsystem can identify meeting notes shared between Participant A and the requesting user and generate the following generative AI prompt: "Generate a brief summary about Participant A in the context of the present virtual meeting entitled "Project B Braining Storming Session" based on the following shared meeting notes . . . " with the shared meeting notes appended onto the end of the generative AI prompt.

In some embodiments, the generated participant summary includes a text summary. The text summary can include one or more strings of text. In some embodiments, the participant summary can include data in another format (e.g., an audio summary of information associated with Participant A). In the illustrated example, the generative AI model can generate an information item detailing information associated with Participant A: "Lead of Project 'B' since August. Former XYZ consultant. Declined previous proposals."

In some embodiments, the generative AI model can generate an information item in response to Participant A joining the virtual meeting or after a pre-determined amount after Participant A joins the virtual meeting. Textual data of information items can be stored (e.g., in a data store 140) and retrieved in response to a user interaction with UI element 214A. In some embodiments, the generative AI model can generate an information item and display the information within region 216A in response to a user interaction with UI element 214A. In some embodiments, the generative AI model can generate/update information items periodically (e.g., every 10 minutes) throughout virtual 122.

In some embodiments, information items can include one or more calendar events displayed within region 202B. Participant information manager 138 can use one or more Application Programming Interfaces (APIs) provided by a calendar software application to obtain one or more calendar events generated by the calendar software application. The one or more calendar events can include one or more meetings (e.g., virtual meetings, physical meetings, etc.) that Participant A and the requesting participant are scheduled to attend. In some embodiments, participant information manager 138 can be configured to access the one or more calendar events and display information based on the calendar event within region 216B. For example, participant information manager 138 may provide dates associated with the one or more calendar events for presentation within region 216B of UI 108A-N, as illustrated. In some embodiments, the calendar events can be clickable elements. Responsive to a user interaction with a calendar event displayed within the region 216B, participant information manager 138 can be configured to provide additional details related to the corresponding calendar event for display (e.g., within region 216B, within a separate UI, etc.). Such additional details can include data that indicates a user that organized the corresponding calendar event, a start time, an end time, a location of the event (which can include a physical location or can include data used to access a virtual meeting), and the like.

In some embodiments, virtual meeting manager 132 can provide a note-taking region 216C for display within region 202A. Note-taking region 216C can be a dedicated area within the region 202A of the UI 108A-N that the user can take notes via an input device (e.g., a keyboard, an alphanumeric keyboard, a touch screen, etc.). The user can input notes related to Participant A within note-taking region 216C for subsequent reference. In the illustrated example, the user can input the following textual note to the note-taking region 216C associated with Participant A: "Vacations in Austria, skiing with family, recruited by Mariene, seems more willing to discuss alternatives now." In some embodiments, virtual meeting manager 132 can store data (e.g., textual data) input to note-taking region 216C to a data store (e.g., data store 140) in association with the user and corresponding participant. The stored textual data can be provided within a note taking region associated with the corresponding participant at subsequent virtual meetings with the corresponding participant. For example, notes input to the region 216C can be available to the user at subsequent virtual meetings with Participant A. In some embodiments, each of the regions 216A-C can include a UI element (e.g., an icon) indicating the source of the information displayed within the respective region 216A-C, as illustrated with respect to FIG. 2B.

In some embodiments, Virtual meeting manager 132 can provide one or more additional information items not displayed with respect to FIG. 2B. For example, virtual meeting manager 132 can display contact information associated with Participant A within region 202A. Contact information can include, but is not limited to, company, role, name, email, phone number, and the like. In some embodiments, virtual meeting manager 132 can be integrated with a software application for maintaining contact information, such as a contacts application on a client device. In some embodiments, participant information manager 138 can use one or more APIs provided by the contacts application to obtain contact information.

In some embodiments, the "flipped" region 202A can include a thumbnail region (not illustrated). The thumbnail region can be a region to display a scaled-down version of Participant A's video stream or screen share. Virtual meeting manager 132 can cause a visual item corresponding to a visual stream of Participant A within the thumbnail region. Responsive to a subsequent user interaction with UI element 214A, the UI 108A-N can be programmed to create an animated effect to transition from displaying information items associated with Participant A (and the scaled-down version of Participant A's video stream) back to displaying a visual item of the video stream of Participant A across the entirety of region 202A, as illustrated above with respect to FIG. 2A.

In some embodiments, a "flipped" region 202A can be automatically "pinned" such that region 202A remains visible within UI 108A-N. In some embodiments, the information items displayed within regions 216A-C can be personal to the user/participant using the tool and is not shared with other participants in virtual meeting 122 or with any other user of virtual meeting platform 120. Additionally, the participant whose information is being may not be made aware of the existence or use of the information displayed within regions 216A-C. For example, virtual meeting platform 120 may refrain from notifying participant A about the existence of the information displayed within regions 216A-C.

Figure 3A:
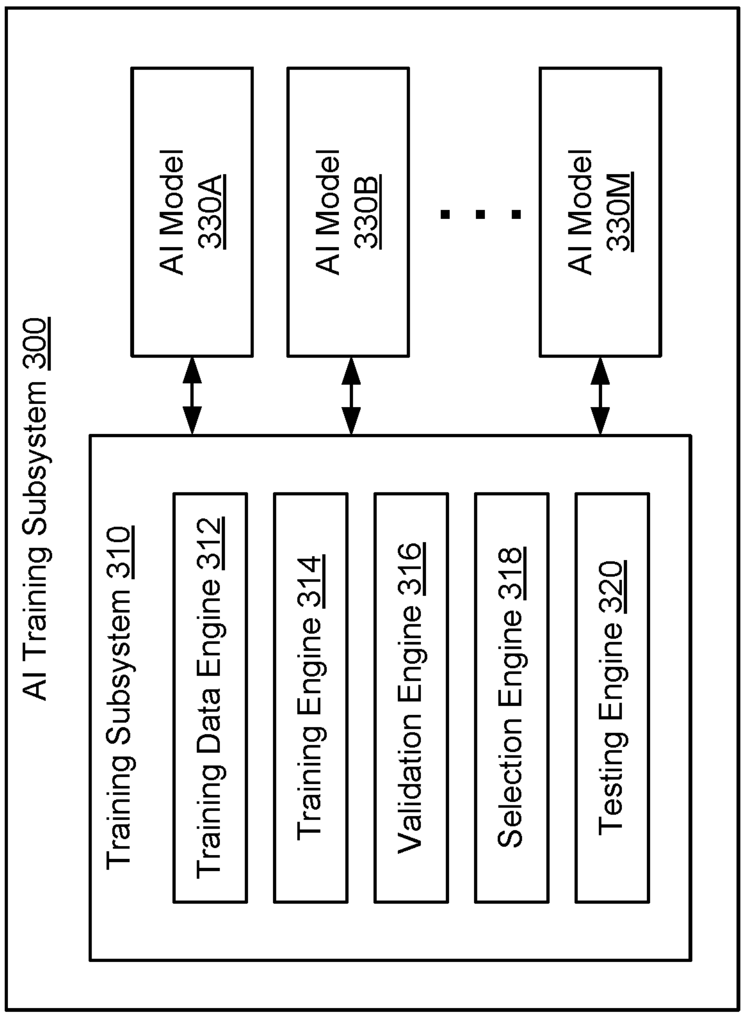
FIG. 3A illustrates an example Artificial Intelligence (AI) training subsystem that can be used to train one or more AI models, in accordance with implementations of the present disclosure.

FIG. 3A illustrates an example AI training subsystem 300 that can be used to train one or more AI models 330A-M, in accordance with implementations of the present disclosure. As illustrated in FIG. 3A, the AI training subsystem 300 can include a training subsystem 310, which may include a training data engine 312, a training engine 314, a validation engine 316, a selection engine 318, or a testing engine 320. The AI training subsystem 300 may include one or more AI models 330A-M.

In one implementation, an AI model 330A-M includes one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short-term memory (LSTM) neural network.

ANNs can learn in a supervised (e.g., classification) or unsupervised (e.g., pattern analysis) manner. Some ANNs (e.g., such as deep neural networks) can include a hierarchy of layers, where the different layers learn different levels of representations that correspond to different levels of abstraction. In deep learning, each level learns to transform its input data into a slightly more abstract and composite representation.

In one implementation, an AI model 330A-M includes a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), an LLM, or a diffusion model. In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 330A-M is an AI model that has been trained on a corpus of data. For example, the AI model 330A-M can be an AI model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 330A-M to learn broad elements including, image or speech recognition, general sentence structure, common phrases, vocabulary, natural language structure, and other elements. In some implementations, this first foundational model is trained using self-supervision, or unsupervised training on such datasets.

In some implementations, the second portion of training, including fine-tuning, includes unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 330A-M while training may be ranked by a user, according to a variety of factors, including accuracy, helpfulness, veracity, acceptability, or any other metric useful in the fine-tuning portion of training. In this manner, the AI model 330A-M can learn to favor these and any other factors relevant to users when generating a response. Further details regarding training are provided below.

In some implementations, an AI model 330A-M includes one or more pre-trained models, or fine-tuned models. In a non-limiting example, in some implementations, the goal of the "fine-tuning" can be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

In one implementation, the training subsystem 310 manages the training and testing of an AI model 330A-M. The training data engine 312 can generate training data to train an AI model 330A-M. In an illustrative example, the training data engine 312 can initialize a training set T to null (e.g., { }). The training data engine 312 can add the training data to the training set T and can determine whether training set T is sufficient for training an AI model 330A-M. The training set T can be sufficient for training the AI model 330A-M if the training set T includes a threshold amount of training data, in some implementations. In response to determining that the training set T is not sufficient for training, the training data engine 312 can identify additional data to use as training data. In response to determining that the training set T is sufficient for training, the training data engine 312 can provide the training set T to the training engine 314.

The training engine 314 can train an AI model 330A-M using the training data (e.g., training set T). The AI model 330A-M can refer to the model artifact that is created by the training engine 314 using the training data, where such training data can include training inputs and, in some implementations, corresponding target outputs. The training engine 314 can input the training data into the AI model 330A-M so that the AI model 330A-M can find patterns in the training data and configure itself based on those patterns.

Where the AI model 330A-M uses supervised learning, the training engine 314 can assist the AI model 330A-M in determining whether the AI model 330A-M maps the training input to the target output. Where the AI model 330A-M uses unsupervised learning, the training engine 314 can input the training data into the AI model 330A-M The AI model 330A-M can configure itself based on the input training data, but since the training data may not include a target output, the training engine 314 may not assist the AI model 330A-M in determining whether the AI model 330A-M provided a correct output during the training process.

The validation engine 316 can be capable of validating a trained AI model 330A-M using a corresponding set of features of a validation set from the training data engine 312. The validation engine 316 can determine an accuracy of each of the trained AI models 330A-M based on the corresponding sets of features of the validation set. Where the training data may not include a target output, validating a trained AI model 330A-M may include obtaining an output from the AI model 330A-M and providing the output to another entity for evaluation. The other entity may include another AI model configured to evaluate the output of the AI model 330A-M that is undergoing training. The other entity may include a human. The validation engine 316 can discard a trained AI model 330A-M that has an accuracy that does not meet a threshold accuracy or that otherwise fails evaluation. In some implementations, the selection engine 318 is capable of selecting a trained AI model 330A-M that has an accuracy that meets a threshold accuracy. In some implementations, the selection engine 318 may be capable of selecting the trained AI model 330A-M that has the highest accuracy of multiple trained AI models 330A-M. In some implementations, the selection engine 318 receives input from another AI model or a human and can select a trained AI model 330A-M based on the input.

The testing engine 320 can be capable of testing a trained AI model 330A-M using a corresponding set of features of a testing set from the training data engine 312. For example, a first trained AI model 330A that was trained using a first set of features of the training set may be tested using the first set of features of the testing set. The testing engine 320 can determine a trained AI model 330A-M that has the highest accuracy or other evaluation of all of the trained AI models 330A-M based on the testing sets.

In one implementation, the training engine 314 trains an AI model 330A. The training data engine 312 can generate training data, and the training engine 314 can cause the AI model 330A to undergo an AI model training process using the training data. The AI model 330A can undergo a validation and testing process using the validation engine 316 and testing engine 320.

In some implementations, the AI training subsystem 300 is part of the server 130, the virtual meeting manager 132, or the participant information manager 138. Alternatively, the AI training subsystem 300 may be part of another server, system, sub-system, or it may be an independent system. In some implementations, the AI training subsystem 300 provides the trained one or more AI models 330A-M to the participant information manager 138.

Figure 3B:
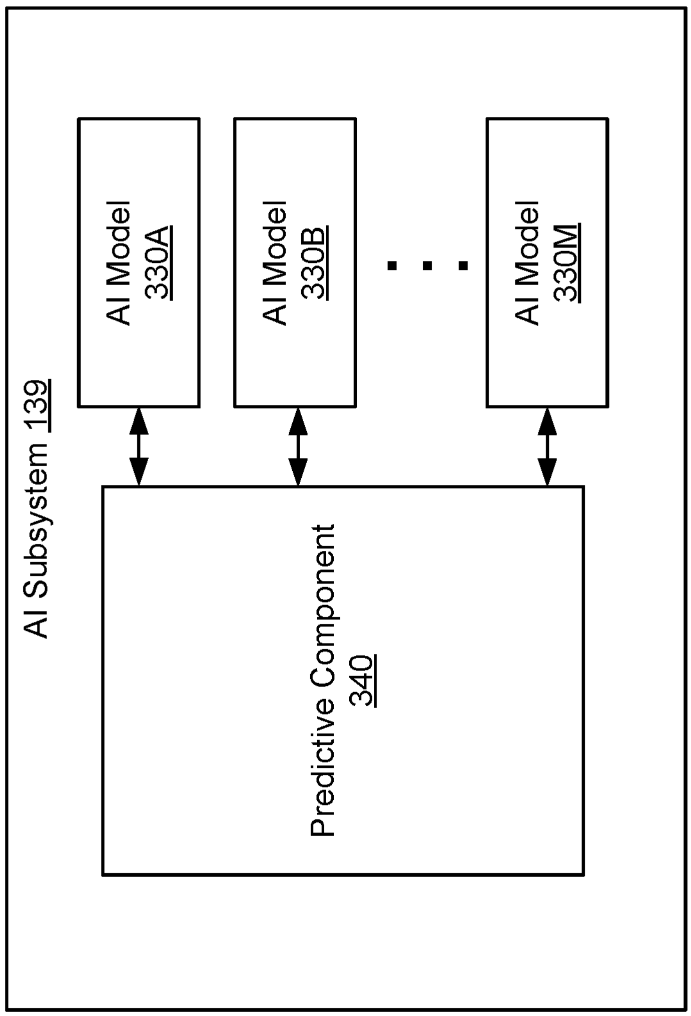
FIG. 3B illustrates an example AI subsystem that the participant information manager can use to perform one or more operations, in accordance with implementations of the present disclosure.

FIG. 3B illustrates an example AI subsystem 139 that the participant information manager 138 can use to perform one or more operations, in accordance with implementations of the present disclosure. The AI subsystem 139 may include one or more AI models 330A-M. The one or more AI models 330A-M may include one or more of the AI models 330A-M trained by the AI training subsystem 300.

In some implementations, the AI subsystem 139 includes a predictive component 340. The predictive component 340 can be configured to feed data as input to an AI model 330A-M, e.g., a transcript of the virtual meeting 122 from the participant information manager 138. The predictive component 340 can be configured to obtain one or more outputs from the one or more AI models 330A-M and provide the one or more outputs to the participant information manager 138.

As indicated above, in some embodiments, an AI model 330A-M includes an LLM. In some embodiments, the LLM includes generative AI functionality. The AI model 330A-M can generate new content based on provided input data (e.g., a transcript of the virtual meeting 122). The generative AI model 330A-M can be supported by a prompt subsystem (not shown), which can be part of the system architecture 100. The prompt subsystem can enable a user or a component of the system architecture 100 to access the generative AI model 330A-M. The prompt subsystem can be configured to perform automated identification of, and facilitate retrieval of, relevant and timely contextual information for efficient and accurate processing of prompts by the AI model 330A-M. Using the network 150 (or another network), the prompt subsystem may be in communication with one or more of the virtual meeting manager 132 or the participant information manager 138. Communications between the prompt subsystem and the predictive component 340 can be facilitated by a generative model application programming interface (API), in some embodiments. Communications between the prompt subsystem and the virtual meeting manager 132 or the participant information manager 138 can be facilitated by a data management API. In additional or alternative embodiments, the generative model API translates prompts generated by the prompt subsystem into unstructured natural-language format and, conversely, translates responses received from the AI model 330A-M into any suitable form (e.g., including any structured proprietary format as may be used by the prompt subsystem). Similarly, the data management API can support instructions that may be used to communicate data requests to the virtual meeting manager 132 or the participant information manager 138 and formats of data received from such components.

The prompt subsystem may include (or may have access to) instructions stored on one or more tangible, machine-readable storage media of a computing device (e.g., the server 130 or client device 102A-N) and executable by one or more processing devices of the computing device. In one embodiment, the prompt subsystem can be implemented on a single machine. In some embodiments, the prompt subsystem may be a combination of a client component and a server component. Alternatively, some portion of the prompt subsystem may be executed on a client computing device while another portion of the query tool may be executed on a server machine.

Figure 4:
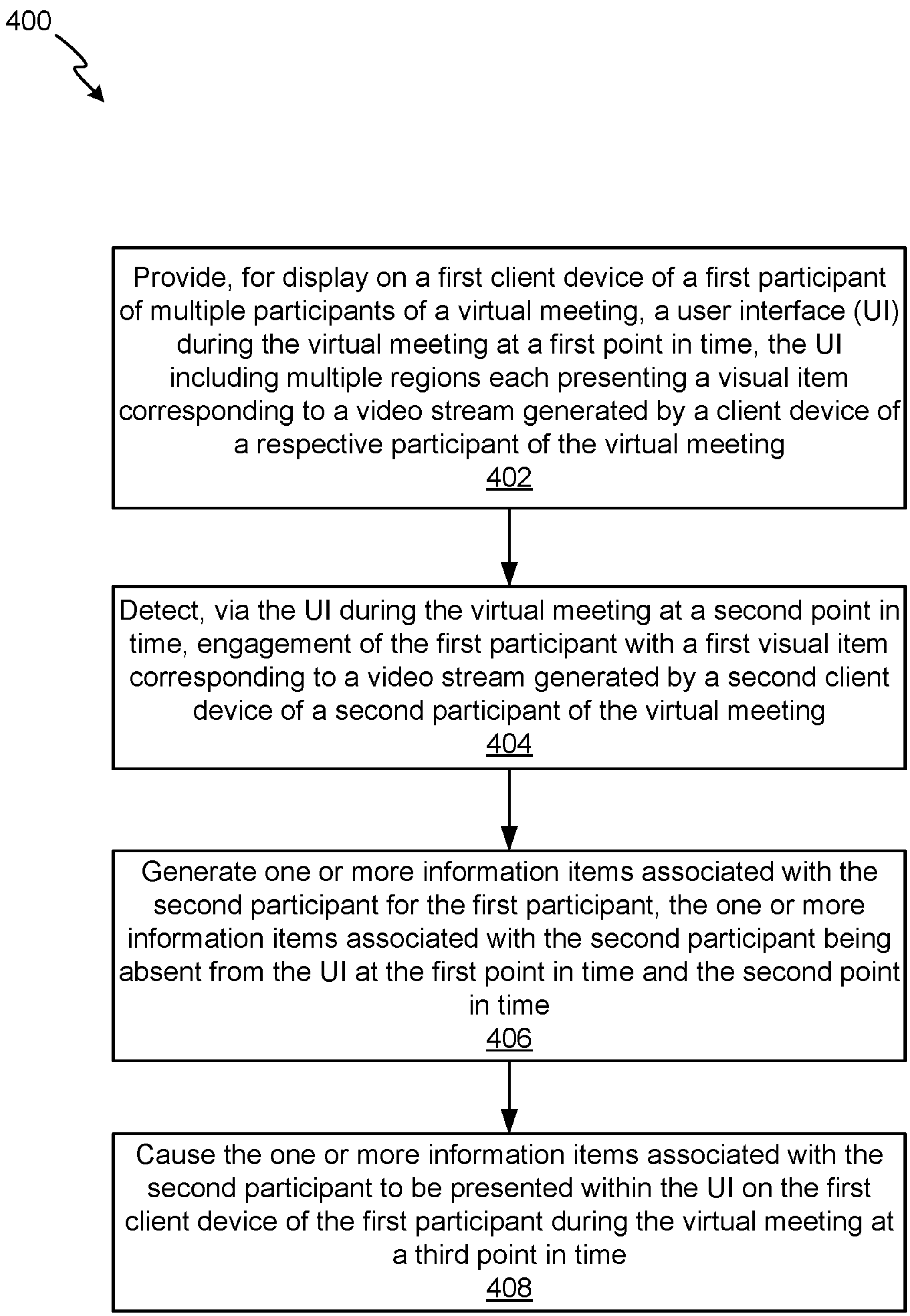
FIG. 4 depicts a flow diagram of a method for generating participant-specific information in a virtual meeting, in accordance with at least one embodiment of the present disclosure.

FIG. 4 depicts a flow diagram of a method 400 for generating participant-specific information in a virtual meeting, in accordance with at least one embodiment of the present disclosure. Method 400 may be performed by processing logic that may include hardware (circuitry, dedicated logic, etc.), software (e.g., instructions run on a processing device), firmware, and/or a combination thereof. In one implementation, some or all the operations of method 400 may be performed by one or more components of system 100 of FIG. 1 (e.g., server 130, client device 102A-N, virtual meeting manager 132, participant information manager 138, etc.).

For simplicity of explanation, the method 400 of this disclosure is depicted and described as a series of acts. However, acts in accordance with this disclosure may occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 402 of method 400, processing logic provides, for display on a first client device (e.g., client device 102A) of a first participant of a plurality of participants of a virtual meeting (e.g., virtual meeting 122), a user interface (UI) during the virtual meeting at a first point in time. The UI includes multiple regions each presenting a visual item corresponding to a video stream generated by a client device of a respective participant of the virtual meeting. For example, the UI can include regions 202A-C, as illustrated with respect to FIG. 2A.

At block 404 of method 400, processing logic detects, via the UI during the virtual meeting at a second point in time, engagement of the first participant with a first visual item corresponding to a video stream generated by a second client device of a second participant of the virtual meeting. For example, the processing logic can detect engagement with the visual item displayed within region 202A, as illustrated with respect to FIG. 2A.

At block 406 of method 400, processing logic generates one or more information items associated with the second participant for the first participant. The one or more information items associated with the second participant are being absent from the UI at the first point in time and the second point in time. In some embodiments, the one or more information items include a meeting history obtained from a calendar application. In some embodiments, the one or more information items include data associated with the first participant obtained from a contacts application.

In some embodiments, to generate the one or more associated with the second participant for the first participant, the processing logic can automatically generate a prompt using information associated with the virtual meeting. The processing logic can provide the prompt and context associated with the engagement of the first participant with the first visual item corresponding to the video stream generated by the second client device as input to a generative Artificial Intelligence (AI) model. The processing logic can obtain one or more outputs from the generative AI model and generate the one or more information items using the one or more outputs. In some embodiments, the context includes at least one of documents, meeting notes, emails, meeting summarizations, or web browser history associated with the first participant. In some embodiments, to automatically generate the prompt using information associated with the virtual meeting, the processing logic can generate the prompt using at least one of a title of the virtual meeting, shared meeting notes associated with the virtual meeting, a name of the first participant, or an email address of the first participant.

At block 408 of method 400, processing logic causes the one or more information items associated with the second participant to be presented within the UI on the first client device of the first participant during the virtual meeting at a third point in time. In some embodiments, to cause the one or more information items associated with the second participant to be presented within the UI on the first client device of the first participant during the virtual meeting at the third point in time, the processing logic can cause a region of the UI corresponding to the first visual item to be updated to display the one or more information item. For example, processing logic can cause information items 216A-C to be presented within region 202A.

In some embodiments, responsive to receiving input from the first participant via the first client device indicative of a request to update the one or more information items, processing logic can update the one or more information items according to the received input. For example, the first participant can input notes in note-taking region 216C via an input device (e.g., a keyboard, an alpha-numeric keyboard, a touch screen, etc.).

Figure 5:
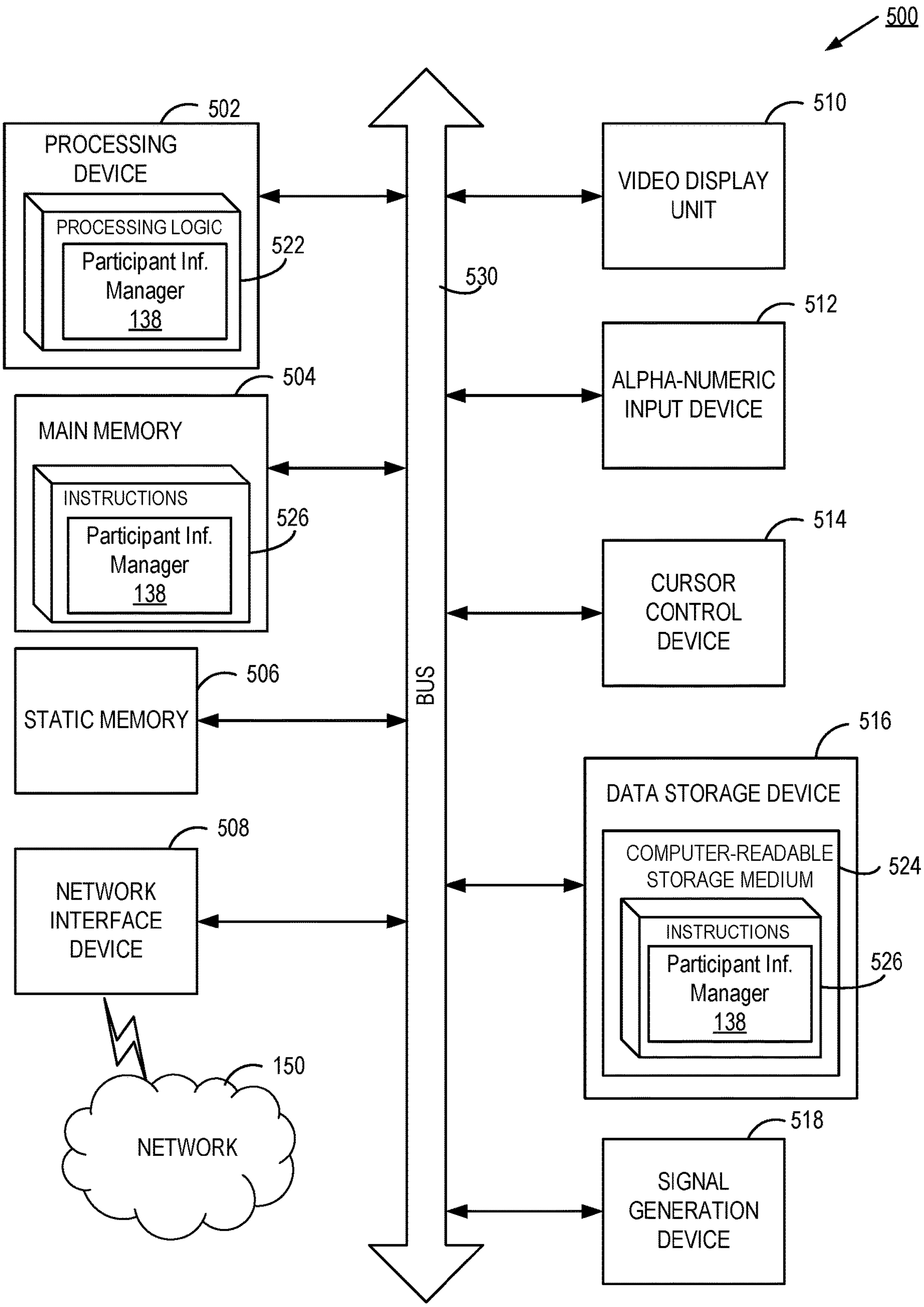
FIG. 5 depicts a block diagram illustrating an example computer system, in accordance with implementations of the present disclosure.

FIG. 5 is a block diagram illustrating an example computer system 500, in accordance with implementations of the present disclosure. The computer system 500 can include a client device 102A-N, 104, the virtual meeting platform 120, or the server 130 in FIG. 1. The machine can operate in the capacity of a server or an endpoint machine, in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random-access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 516, which communicate with each other via a bus 530.

The processing device 502 represents one or more general-purpose processing devices such as a microprocessor, central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 702 is configured to execute the processing logic 522 for performing the operations discussed herein (e.g., the operations of the participant information manager 138).

The computer system 500 can further include a network interface device 708. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 518 (e.g., a speaker).

The data storage device 516 can include a non-transitory machine-readable storage medium 524 (sometimes referred to as a "computer-readable storage medium") on which is stored one or more sets of instructions 526 (e.g., the instructions to carry out one or more operations of the absent user manager 138) embodying any one or more of the methodologies or functions described herein. The instructions can also reside, completely or at least partially, within the main memory 504 and/or within the processing device 502 during execution thereof by the computer system 500, the main memory 504 and the processing device 502 also constituting machine-readable storage media. The instructions can further be transmitted or received over the network 150 via the network interface device 508.

In one implementation, the instructions 526 include instructions for determining visual items for presentation in a user interface of a virtual meeting. While the computer-readable storage medium computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

providing, for display on a first client device of a first participant of a plurality of participants of a virtual meeting, a user interface (UI) during the virtual meeting at a first point in time, the UI comprising a plurality of regions each presenting frames of a video stream generated by a client device of a respective participant of the virtual meeting and depicting the respective participant;

detecting, via the UI during the virtual meeting at a second point in time, engagement of the first participant with a first region presenting frames of a video stream generated by a second client device of a second participant of the virtual meeting;

generating one or more information items associated with the second participant for the first participant, the one or more information items associated with the second participant being absent from the UI at the first point in time and the second point in time; and causing the one or more information items associated with the second participant to be presented within the first region of the UI on the first client device of the first participant during the virtual meeting at a third point in time.

2. The method of claim 1, wherein generating one or more information items associated with the second participant for the first participant comprises:

automatically generating a prompt using information associated with the virtual meeting;

providing the prompt and context associated with the engagement of the first participant with the first region presenting the frames of the video stream generated by the second client device as input to a generative Artificial Intelligence (AI) model;

obtaining one or more outputs from the generative AI model; and generating the one or more information items using the one or more outputs.

3. The method of claim 2, wherein automatically generating the prompt using information associated with the virtual meeting comprises:

generating the prompt using at least one of a title of the virtual meeting, shared meeting notes associated with the virtual meeting, a name of the first participant, or an email address of the first participant.

4. The method of claim 2, wherein the context comprises at least one of documents, meeting notes, emails, meeting summarizations, or web browser history associated with the first participant.

5. The method of claim 1, wherein the one or more information items include a meeting history obtained from a calendar application.

6. The method of claim 1, wherein the one or more information items include data associated with the first participant obtained from a contacts application.

7. The method of claim 1, wherein causing the one or more information items associated with the second participant to be presented within the first region of the UI on the first client device of the first participant during the virtual meeting at the third point in time comprises:

causing the first region of the UI to be updated to display the one or more information item.

8. The method of claim 1, further comprising:

responsive to receiving input from the first participant via the first client device indicative of a request to update the one or more information items, updating the one or more information items according to the received input.

9. A system comprising:

a memory device; and a processing device coupled to the memory device, the processing device to perform operations comprising:

providing, for display on a first client device of a first participant of a plurality of participants of a virtual meeting, a user interface (UI) during the virtual meeting at a first point in time, the UI comprising a plurality of regions each presenting frames of a video stream generated by a client device of a respective participant of the virtual meeting and depicting the respective participant;

detecting, via the UI during the virtual meeting at a second point in time, engagement of the first participant with a first region presenting frames of a video stream generated by a second client device of a second participant of the virtual meeting;

generating, using a generative Artificial Intelligence (AI) model, one or more information items associated with the second participant for the first participant, the one or more information items associated with the second participant being absent from the UI at the first point in time and the second point in time; and causing the one or more information items associated with the second participant to be presented within the first region of the UI on the first client device of the first participant during the virtual meeting at a third point in time.

10. The system of claim 9, wherein generating, using the generative Artificial Intelligence (AI) model, one or more information items associated with the second participant for the first participant comprises:

automatically generating a prompt using information associated with the virtual meeting;

providing the prompt and context associated with the engagement of the first participant with the first region presenting the frames of the video stream generated by the second client device as input to the generative Artificial Intelligence (AI) model;

obtaining one or more outputs from the generative AI model; and generating the one or more information items using the one or more outputs.

11. The system of claim 10, wherein automatically generating the prompt using information associated with the virtual meeting comprises:

generating the prompt using at least one of a title of the virtual meeting, shared meeting notes associated with the virtual meeting, a name of the first participant, or an email address of the first participant.

12. The system of claim 10, wherein the context comprises at least one of documents, meeting notes, emails, meeting summarizations, or web browser history associated with the first participant.

13. The system of claim 9, wherein the one or more information items include a meeting history obtained from a calendar application.

14. The system of claim 9, wherein the one or more information items include data associated with the first participant obtained from a contacts application.

15. The system of claim 9, wherein causing the one or more information items associated with the second participant to be presented within the first region of the UI on the first client device of the first participant during the virtual meeting at the third point in time comprises:

causing the first region of the UI to be updated to display the one or more information item.

16. The system of claim 9, wherein the operations further comprise:

responsive to receiving input from the first participant via the first client device indicative of a request to update the one or more information items, updating the one or more information items according to the received input.

17. A non-transitory computer-readable storage medium comprising instructions that, when executed by a processing device, cause the processing device to perform operations comprising:

providing, for display on a first client device of a first participant of a plurality of participants of a virtual meeting, a user interface (UI) during the virtual meeting at a first point in time, the UI comprising a plurality of regions each presenting frames of a video stream generated by a client device of a respective participant of the virtual meeting and depicting the respective participant;

detecting, via the UI during the virtual meeting at a second point in time, engagement of the first participant with a first region presenting frames of a video stream generated by a second client device of a second participant of the virtual meeting;

generating one or more information items associated with the second participant for the first participant, the one or more information items associated with the second participant being absent from the UI at the first point in time and the second point in time; and causing the one or more information items associated with the second participant to be presented within the first region of the UI on the first client device of the first participant during the virtual meeting at a third point in time.

18. The non-transitory computer-readable storage medium of claim 17, wherein generating one or more information items associated with the second participant for the first participant comprises:

automatically generating a prompt using information associated with the virtual meeting;

providing the prompt and context associated with the engagement of the first participant with the first region presenting the frames of the video stream generated by the second client device as input to a generative Artificial Intelligence (AI) model;

obtaining one or more outputs from the generative AI model; and generating the one or more information items using the one or more outputs.

19. The non-transitory computer-readable storage medium of claim 18, wherein automatically generating the prompt using information associated with the virtual meeting comprises:

generating the prompt using at least one of a title of the virtual meeting, shared meeting notes associated with the virtual meeting, a name of the first participant, or an email address of the first participant.

20. The non-transitory computer-readable storage medium of claim 18, wherein the context comprises at least one of documents, meeting notes, emails, meeting summarizations, or web browser history associated with the first participant.

* * * * *